Dec. 24, 1929.                C. E. JOHNSON                1,740,599
INDUCTION MOTOR WITH MOVABLE MAGNETIC BRIDGES
Filed July 28, 1926

INVENTOR:
CARL E. JOHNSON,
BY
ATTORNEY.

Patented Dec. 24, 1929

1,740,599

UNITED STATES PATENT OFFICE

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA

INDUCTION MOTOR WITH MOVABLE MAGNETIC BRIDGES

Application filed July 28, 1926. Serial No. 125,346.

My invention relates to induction motors. In the ordinary induction motor it is necessary to provide a starting device for controlling the supply of current to the primary winding of the stator to prevent a high induced current from being set up and the motor being burned out. The starting device prevents a high current from being drawn while the motor is starting, the full current being given to the motor as full speed is reached.

It is an object of this invention to provide an induction motor which automatically limits the starting current so that no burning out will occur, but the pull-out torque will be high.

My invention includes a rotor having an outer high resistance secondary winding and an inner low resistance secondary winding. When the motor is being started the rotated field cuts only the high resistance winding. The rotor of the motor has a means for automatically causing the rotated field to cut the low resistance secondary winding as the rotor accelerates.

It is accordingly one of the objects of this invention to provide a motor in which the rotor thereof is provided with high and low resistance secondary windings and means for causing the rotating field to cut the low resistance secondary winding as the rotor accelerates.

It is a well known fact that a higher power factor may be obtained if the low resistance secondary winding is near to the periphery of the rotor, and it is an object of this invention to provide a rotor having this feature.

Other objects and advantages will be made evident hereinafter.

Referring to the drawings in which I illustrate one form of my invention,

Figure 1:
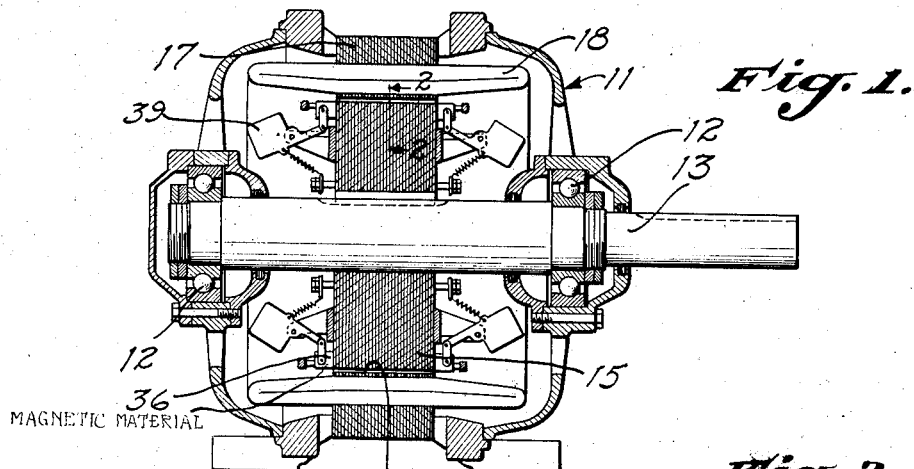
Fig. 1 is a cross section through a motor embodying the features of my invention.

Referring in detail to the drawings and particularly to Fig. 1, the numeral 11 represents a motor having bearings 12 which support a rotor shaft 13. Secured to the rotor shaft 13 is a rotor 15 which is positioned in a cylindrical bore 16 formed through a stator 17. The stator 17 is provided with a primary winding 18 which may be connected to a polyphase current source in order that the stator may set up a rotating field.

The rotor 15 which incorporates the important features of this invention, consists of a cylindrical magnetic body 20 which, according to standard practice, is composed of a multiplicity of punchings. The rotor 15 carries an outer high resistance secondary winding 21 and an inner low resistance secondary winding 22.

Figure 3:
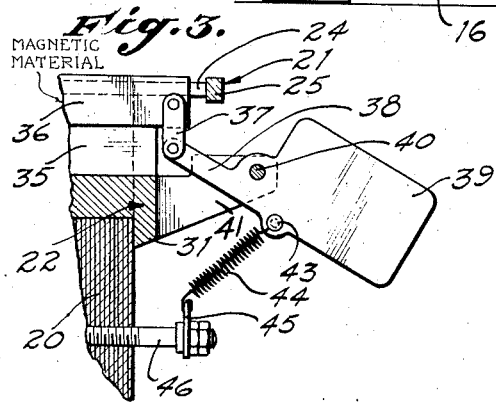
Fig. 3 is a section taken on the line 3—3 of Fig. 2.
Figure 5:
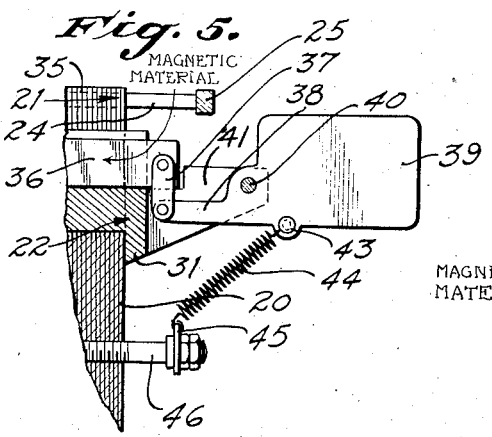
Fig. 5 is a section taken on the line 5—5 of Fig. 4.

The high resistance winding 21 consists of outer conductor bars 24 which extend axially through the magnetic body 20, extending through openings which are circularly arranged very close to the periphery of the magnetic body 20. The ends of the outer conductor bars 24 are connected together by outer short-circuiting end rings 25 which, as illustrated in Figs. 3 and 5, are spaced a distance away from the ends of the magnetic body 20. The high resistance winding 21 may be made of a high resistance metal and the cross section of the conductor bars and end rings may be small.

Figure 2:
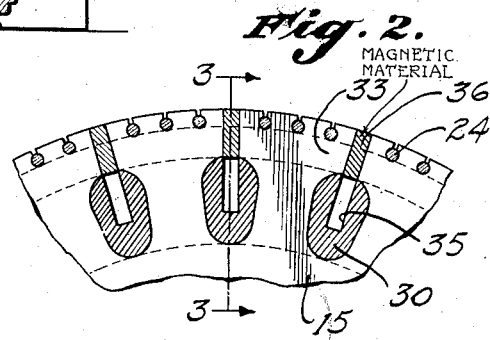
Fig. 2 is an enlarged fragmentary section taken on the line 2—2 of Fig. 1, showing the rotor when it is at rest.
Figure 4:
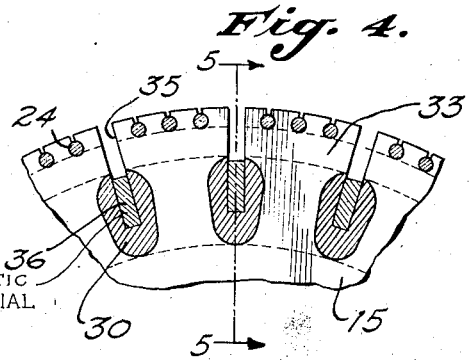
Fig. 4 is a section similar to Fig. 2 but showing the rotor in running position.

The low resistance winding 22 has inner conductor bars 30 which extend axially through the magnetic body 20, the inner conductor bars 30 extending through circularly arranged openings formed in the magnetic body 20. The ends of the inner conductor bars are connected to inner end rings 31, which rest against the ends of the body 20. As shown best in Figs. 2 and 4, the inner conductor bars 30 are in cricular arrangement immediately inside the outer conductor bars 24, but quite near to the periphery of the magnetic body 20. The inner conductor bars 30 and the end rings 31 are of large area of cross section. There are fewer inner conductor bars 30 than there are outer conductor bars 24, as shown in Figs. 2 and 4. The inner conductor bars 30 are placed quite close to the outer conductor bars 24; however, there is a small space existing between the inner and outer conductor bars, which space serves as a magnetic leakage path and is designated by the numeral 33.

Formed from the periphery of the magnetic body 20 are slots 35, these slots 35 extending parallel to the axis of the rotor 15 and being radially arranged around the axis. The slots 35 are formed so that the bottom ends or inner ends extend into the outer parts of the inner conductor bars 30, this being clearly shown in Figs. 2 and 4. Placed in each slot 35 is a magnetic bridge 36. Referring in particular to Figs. 3 and 5, the ends of each bridge 36 have links 37 pivotally connected thereto. The inner end of each link 37 is pivoted to an arm 38 which has a governor weight 39. Each governor weight 39 is pivoted on a shaft 40 which is supported by a pair of arms 41 which as shown in the drawings may extend from one of the inner end rings 31. Attached to each governor weight 39 at an eye 43 is a coil spring 44. The opposite end of each coil spring 44 is connected to a plate 45 supported by a stud 46. Each stud 46, as illustrated in Figs. 3 and 5, is secured to the magnetic body 20.

When the rotor is at rest the springs 44 hold the governor weights 39 in positions shown in Fig. 3. The bridges 36 are at this time supported in the positions shown in Figs. 2 and 3 and occupy positions in the slots 35 within the area of the magnetic leakage path 33.

When the rotor is set into rotation centrifugal force gradually throws the governor weights 39 outward from the position shown in Fig. 3 into the position shown in Fig. 5. The magnetic bridges 36 are moved inward from the positions shown in Fig. 2 and from their positions in the magnetic leakage path 33 into the inner ends of the slots 35, so that they rest within the inner conductor bars 30, being entirely outside of the magnetic leakage path 33.

When the motor is being started the primary winding 18 is supplied with polyphase current and a rotating field is established. At this time the rotor 15 is at rest and the magnetic bridges 36 are positioned in the outer ends of the slots 35 and in the magnetic leakage path 33. The magnetic leakage path at this time is continuous and the reluctance thereof is very low. The magnetic lines of force will cut the outer conductor bars 24 and be by-passed from the inner conductor bars by reason of the fact that the reluctance of the magnetic leakage path is very low. Since only the outer conductor bars 24 are cut by the rotating field, there will be no high induced current and there will be no heavy draw of current by the primary winding 18.

As the motor accelerates the governor weights 39 are affected by centrifugal force and are moved outward from the position shown in Fig. 3 into the position shown in Fig. 5.

As previously explained, the magnetic bridges 36 are gradually removed from the magnetic leakage path 33 and gradually moved into the inner ends of the slots 35. The magnetic bridges 36, when they are moved into inner positions, provide large gaps in the magnetic leakage path 33 so that reluctance thereof is very high. When the reluctance of the magnetic leakage path 33 is increased, the lines of force seek a path of higher permeability which is around the inside of the inner bars 30. It will be seen that this increase in the reluctance of the magnetic leakage path 33 causes the lines of force to cut the inner conductor bars 30.

As shown in Fig. 4, the slots 35 are deep enough so that when the magnetic bridges 36 are in inner positions the outer faces thereof rest well within the inner conductor bars 30 so that the tendency for the lines of force to jump across the upper part of the magnetic bridges 36 will be but very little.

From the foregoing description it will be seen that my invention provides an automatic means for, first, causing the rotating field to cut only the high resistance winding, and, second, to cause the rotating field to cut the low resistance secondary winding as the rotor reaches full speed. In the drawings I have illustrated a simple means for operating the magnetic bridges 36, which means is actuated by centrifugal force. This, however, is not the important part of the invention and may be replaced by other bridge-operating means if desired.

I claim as my invention:

1. A motor comprising: a stator; a primary winding for said stator, said primary winding being connected to a polyphase current source for setting up a rotating field; a rotor formed of magnetic material; an outer secondary winding carried by said rotor; an inner secondary winding carried by said rotor, there being a magnetic leakage path existing between said outer and inner windings; a magnetic bridge resting in said magnetic leakage path; and means for automatically moving said bridge out of said magnetic leakage path as said rotor accelerates.

2. A motor comprising: a stator; a primary winding for said stator, said primary winding being connected to a polyphase current source for setting up a rotating field; a rotor formed of magnetic material; an outer secondary winding carried by said rotor; an inner secondary winding carried by said rotor, there being a magnetic leakage path existing between said outer and inner windings; a magnetic bridge resting in said magnetic leakage path; and means actuated by centrifugal force for moving said bridge out of said magnetic leakage path as said rotor accelerates.

3. A motor comprising: a stator; a primary winding for said stator, said primary winding being connected to a polyphase current source for setting up a rotating field; a rotor formed of magnetic material; an outer secondary winding carried by said rotor; an inner secondary winding carried by said rotor, there being a magnetic leakage path existing between said outer and inner windings, there being a slot formed through said magnetic leakage path; a magnetic bridge in said slot and in said magnetic leakage path when said rotor is at rest; and means for moving said magnetic bridge from said magnetic leakage path when said rotor is accelerated.

4. A motor comprising: a stator; a primary winding for said stator, said primary winding being connected to a polyphase current source for setting up a rotating field; a rotor formed of magnetic material; an outer secondary winding carried by said rotor; an inner secondary winding carried by said rotor, there being a magnetic leakage path existing between said outer and inner windings, there being a slot formed through said magnetic leakage path; a magnetic bridge in said slot and in said magnetic leakage path when said rotor is at rest; and means for moving said magnetic bridge inward from said magnetic leakage path when said rotor is accelerated.

5. A motor comprising: a stator; a primary winding for said stator, said primary winding being connected to a polyphase current source for setting up a rotating field; a rotor formed of magnetic material; an outer secondary winding carried by said rotor, an inner secondary winding carried by said rotor, there being a magnetic leakage path existing between said outer and inner windings, there being a radial slot formed through said magnetic leakage path; a magnetic bridge in said slot and in said magnetic leakage path when said rotor is at rest; and means for moving said magnetic bridge radially from said magnetic leakage path when said rotor is accelerated.

6. A motor comprising: a stator; a primary winding for said stator, said primary winding being connected to a polyphase current source for setting up a rotating field; a rotor formed of magnetic material; an outer secondary winding carried by said rotor; an inner secondary winding carried by said rotor, there being a magnetic leakage path existing between said outer and inner windings; there being a radial slot formed through said magnetic leakage path; a magnetic bridge in said slot and in said magnetic leakage path when said rotor is at rest; and means for moving said magnetic bridge radially inward from said magnetic leakage path when said rotor is accelerated.

7. A motor comprising: a stator; a primary winding for said stator, said primary winding being connected to a polyphase current source for setting up a rotating field; a rotor formed of magnetic material; an outer secondary winding carried by said rotor; an inner secondary winding carried by said rotor, there being a magnetic leakage path existing between said outer and inner windings, there being a radial slot formed in said magnetic leakage path and said inner secondary winding; a magnetic bridge in said slot and resting in said magnetic leakage path when said rotor is at rest; and means for moving said magnetic bridge into the bars of said inner secondary winding when said rotor accelerates.

8. A motor comprising: a stator; a primary winding for said stator; a rotor disposed in an opening of said stator; a secondary winding for said rotor, there being a magnetic leakage path between said secondary winding and the periphery of said rotor; a magnetic bridge resting in said magnetic leakage path; and means for removing said magnetic bridge radially from said magnetic leakage path.

9. A motor comprising: a stator; a primary winding for said stator; a rotor disposed in an opening of said stator; a secondary winding for said rotor, there being a magnetic leakage path between said secondary winding and the periphery of said rotor; a magnetic bridge resting in said magnetic leakage path; and means for removing said magnetic bridge radially inward from said magnetic leakage path.

10. A combination as defined in claim 8 in which said magnetic bridge is removed by said means into a position within the bars of said secondary winding.

11. A motor comprising: a stator; a primary winding for said stator; a rotor disposed in an opening of said stator; a secondary winding for said rotor, there being a magnetic leakage path between said secondary winding and the periphery of said rotor; a magnetic bridge resting in said magnetic leakage path; and means for removing said magnetic bridge radially from said magnetic leakage path, said means including a weight attached to said magnetic bridge and operated by centrifugal force.

12. A motor comprising: a stator; a primary winding for said stator; a rotor disposed in an opening of said stator; a secondary winding for said rotor, there being a magnetic leakage path between said secondary winding and the periphery of said rotor; a magnetic bridge resting in said magnetic leakage path; and means for removing said magnetic bridge radially inward from said magnetic leakage path, said means including a weight attached to said magnetic bridge and operated by centrifugal force.

In testimony whereof, I have hereunto set my hand at Los Angeles, California, this 20 day of July, 1926.

CARL E. JOHNSON.